(12) United States Patent
Tokumaru

(10) Patent No.: US 11,988,164 B2
(45) Date of Patent: May 21, 2024

(54) START CONTROL APPARATUS OF INTERNAL COMBUSTION ENGINE

(71) Applicant: ISUZU MOTORS LIMITED, Yokohama (JP)

(72) Inventor: Takeshi Tokumaru, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/473,357

(22) Filed: Sep. 25, 2023

(65) Prior Publication Data

US 2024/0102428 A1 Mar. 28, 2024

(30) Foreign Application Priority Data

Sep. 27, 2022 (JP) .................. 2022-153586

(51) Int. Cl.
*F02D 41/06* (2006.01)
*F02D 41/00* (2006.01)

(52) U.S. Cl.
CPC ....... *F02D 41/062* (2013.01); *F02D 41/0027* (2013.01); *F02D 41/0077* (2013.01); *F02D 2200/0611* (2013.01)

(58) Field of Classification Search
CPC .. F02D 41/062; F02D 41/0027; F02D 41/007; F02D 2200/0611; F02D 41/061
See application file for complete search history.

(56) References Cited

U.S. PATENT DOCUMENTS

2006/0054141 A1* 3/2006 Nozaki ............... F02D 41/0027
123/514

FOREIGN PATENT DOCUMENTS

| JP | 2001-115866 A | 4/2001 |
|---|---|---|
| JP | 2005-030285 A | 2/2005 |
| JP | 2012-202376 A | 10/2012 |
| JP | 2016-061281 A | 4/2016 |
| JP | 2017-150437 A | 8/2017 |

* cited by examiner

*Primary Examiner* — Jacob M Amick
(74) *Attorney, Agent, or Firm* — Shih IP Law Group, PLLC

(57) ABSTRACT

A start control apparatus of an internal combustion engine includes: a gas sensor configured to detect a gas concentration of the liquefied gas fuel in a gasified state at a position near a combustion chamber; a scavenging pump configured to perform scavenging from a position upstream of the combustion chamber to a position downstream of the combustion chamber; and a control unit configured to prohibit a start of the internal combustion engine and operate the scavenging pump when the gas concentration detected by the gas sensor before the start of the internal combustion engine is equal to or greater than a predetermined threshold value.

4 Claims, 2 Drawing Sheets

START CONTROL APPARATUS OF INTERNAL COMBUSTION ENGINE

CROSS REFERENCE TO RELATED APPLICATIONS

This application is entitled to the benefit of Japanese Patent Application No. 2022-153586, filed on Sep. 27, 2022, the disclosure of which including the specification, drawings and abstract is incorporated herein by reference in its entirety.

TECHNICAL FIELD

The present disclosure relates to a start control apparatus of an internal combustion engine.

BACKGROUND ART

Internal combustion engines, in particular diesel engines (compression-ignition internal combustion engines) that use liquefied gas fuel, in particular DME (Di-Methyl Ether) fuel have substantially the same configuration as that of typical diesel engines that use light oil fuel, and the same applies to the starting method.

CITATION LIST

Patent Literature

PTL 1
Japanese Patent Application Laid-Open No. 2017-150437

SUMMARY OF INVENTION

Technical Problem

Incidentally, DME fuel is gas at room temperature and is easier to ignite than light oil. On the other hand, when defects of the injector such as seat defects of the injector nozzle occur, the fuel leaks from the seat part of the nozzle in some situation when the engine is stopped. In this case, when the starter motor is turned on to start the engine next time and the cranking is started, the leaked fuel may ignite at locations not intended in the design immediately after the start of the piston compression and the like. In such cases, repeated impacts to pistons and liners may cause damage to piston rings and liners.

In view of this, an object of the present disclosure is to provide a start control apparatus of an internal combustion engine that can prevent damages to the engine due to the leakage of liquefied gas fuel.

Solution to Problem

A start control apparatus of an internal combustion engine according to an aspect of the present disclosure uses liquefied gas fuel, the start control apparatus including: a gas sensor configured to detect a gas concentration of the liquefied gas fuel in a gasified state at a position near a combustion chamber; a scavenging pump configured to perform scavenging from a position upstream of the combustion chamber to a position downstream of the combustion chamber; and a control unit configured to prohibit a start of the internal combustion engine and operate the scavenging pump when the gas concentration detected by the gas sensor before the start of the internal combustion engine is equal to or greater than a predetermined threshold value.

Preferably, the control unit opens an EGR valve when a predetermined time has elapsed after an operation of the scavenging pump is started.

Preferably, the gas sensor is provided at a position upstream of the combustion chamber.

Preferably, the start control apparatus further includes an additional gas sensor configured to detect a gas concentration of the liquefied gas fuel in a gasified state at a position downstream of the combustion chamber. The control unit allows the start of the internal combustion engine and stops the scavenging pump when a gas concentration detected by the gas sensor becomes equal to or smaller than a predetermined threshold value after a start of an operation of the scavenging pump, and a gas concentration detected by the additional gas sensor becomes equal to or smaller than a predetermined threshold value.

Advantageous Effects of Invention

According to the present disclosure, damages to the engine due to the leakage of liquefied gas fuel can be prevented.

DESCRIPTION OF EMBODIMENTS

Embodiments of the present disclosure are described below with reference to the accompanying drawings. Note that present disclosure is not limited to the following embodiments.

Figure 1:
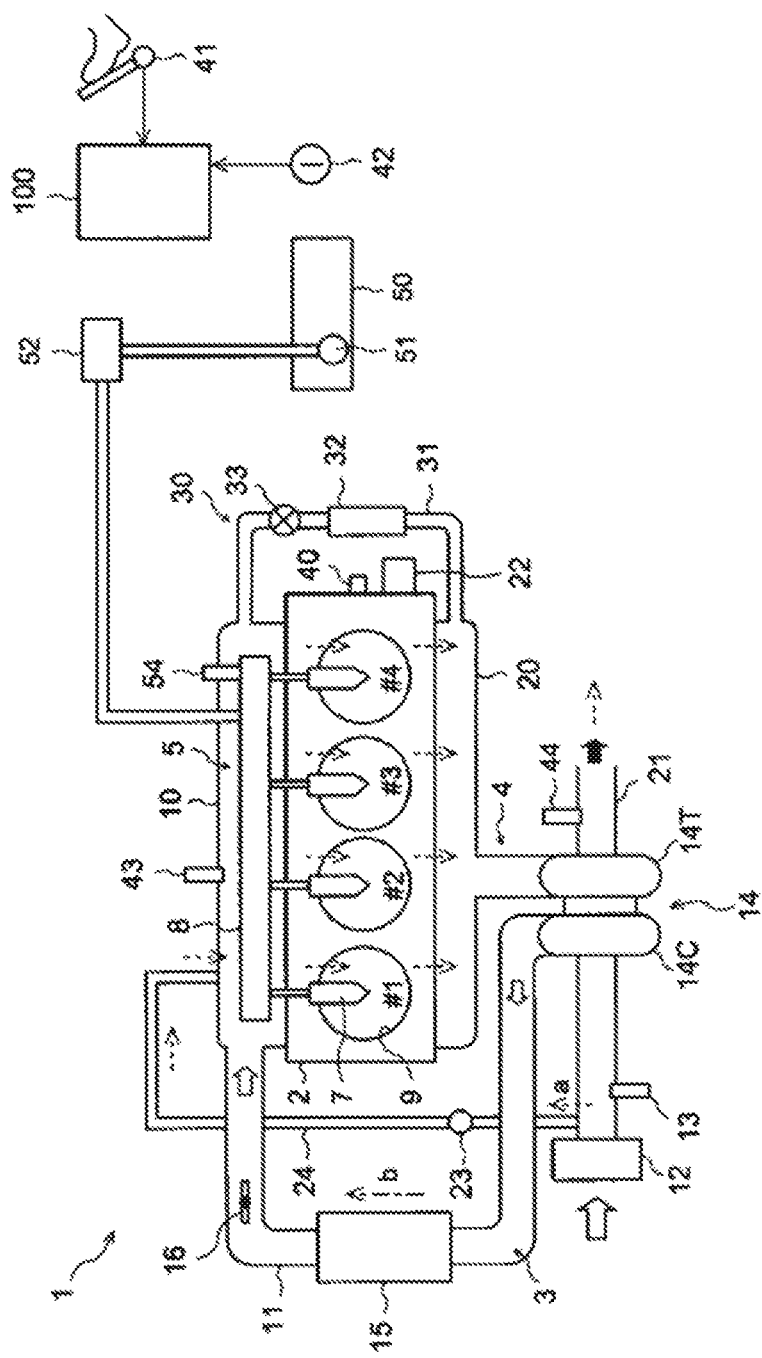
FIG. 1 is a schematic view illustrating an internal combustion engine according to the present embodiment.

FIG. 1 is a schematic view of an internal combustion engine according to an embodiment of the present disclosure. Internal combustion engine 1 is a multi-cylinder (four-cylinder) diesel engine for vehicles, in particular a diesel engine that uses DME fuel, which is liquefied gas fuel. The vehicle is a large vehicle such as a truck. Note that the type of the vehicle is not limited to this, and may be a small-sized vehicle such as a passenger car, for example.

Note that the engine may be applied to a moving machine other than a vehicle, such as a ship, construction equipment and industrial equipment, and may be of a stationary type.

Engine 1 includes engine body 2, suction passage 3 and exhaust passage 4 connected to engine body 2, and fuel injection apparatus 5. Engine body 2 includes structural components such as a cylinder head, a cylinder block and a crank case, and movable components such as a piston, a crankshaft and a valve housed inside the structural components. Flows of suction and exhaust airs are indicated by white and black arrows.

Fuel injection apparatus 5 is composed of a common rail type fuel injection apparatus, and includes a fuel injection valve, i.e., injector 7 provided in each cylinder, and common rail 8 connected to each injector 7. In addition, fuel injection apparatus 5 includes feed pump 51 for suctioning and discharging the fuel inside fuel tank 50, and supply pump 52 for pressurizing the fuel discharged from feed pump 51 to high pressure and supplying it to common rail 8. Feed pump 51 of the present embodiment is composed of an in-tank pump disposed in fuel tank 50. Supply pump 52 is driven by a crankshaft of engine 1, and includes a volume regulation valve for regulating the discharging fuel volume.

Suction passage 3 is mainly defined by suction manifold 10 connected to engine body 2 (in particular, the cylinder head), and suction pipe 11 connected to the upstream end of suction manifold 10. Air cleaner 12, airflow meter 13, compressor 14C of turbocharger 14, inter cooler 15, and electronic control type suction throttle valve 16 are provided in suction pipe 11 in this order from the upstream side in the direction in which suctioned air flows toward combustion chamber 9 of engine body 2. Airflow meter 13 is a sensor (suction amount sensor) for detecting the intake air volume (suction flow rate) per unit time of engine 1.

Exhaust passage 4 is mainly defined by exhaust manifold 20 connected to engine body 2 (in particular, the cylinder head), and exhaust pipe 21 disposed on the downstream side of exhaust manifold 20 in the flow direction of the exhaust air from combustion chamber 9 of engine body 2. Turbine 14T of turbocharger 14 is provided between exhaust pipe 21 or exhaust manifold 20 and exhaust pipe 21. An exhaust post-processing apparatus not illustrated in the drawing is provided in exhaust pipe 21 on the downstream side of turbine 14T. The exhaust post-processing apparatus includes an oxidation catalyst, a particulate filter, a SCR (Selective Catalytic Reduction) catalyst and an ammonia oxidation catalyst in this order from the upstream side in the flow direction of the exhaust air, for example.

Engine 1 also includes EGR (Exhaust Gas Recirculation) apparatus 30. EGR apparatus 30 includes EGR passage 31 for causing reflux of a part of the exhaust air (referred to as EGR gas) in exhaust passage 4 (in particular, exhaust manifold 20) into suction passage 3 (in particular, suction manifold 10), EGR cooler 32 for cooling EGR gas flowing through EGR passage 31, and EGR valve 33 for regulating the flow rate of the EGR gas.

In addition, electronic control unit (referred to as ECU) 100, which is a control unit, a circuit element (circuitry) or a controller for controlling engine 1 is also provided. ECU 100 includes a CPU (Central Processing Unit) with computation functions, a ROM (Read Only Memory) and a RAM (Random Access Memory) as storage medium, input/output ports, storage devices other than the ROM and RAM, and the like.

Further, in addition to the above-described airflow meter 13, crank angle sensor 40 for detecting the crank angle and the rotational speed (more specifically, revolutions per minute (rpm)) of the engine, accelerator position sensor 41 for detecting the accelerator position, and common rail pressure sensor 54 for detecting the common rail pressure are provided. The output signals of these sensors are sent to ECU 100.

ECU 100 controls various devices, i.e., injector 7, the volume regulation valve of supply pump 52, suction throttle valve 16, and EGR valve 33 on the basis of the outputs of the sensors.

Engine body 2 is provided with starter motor 22 for starting the engine. Engine switch 42 for instructing the start and stop of the engine is connected to ECU 100.

As described above, DME fuel is gas at room temperature and is easier to ignite than light oil. On the other hand, when defects of injector 7 such as seat defects of the injector nozzle occur, the fuel leaks from the seat part of the nozzle in some situation when the engine is stopped. In this case, when starter motor 22 is turned on to start the engine next time and the cranking is started, abnormal combustion may occur immediately after the start of piston compression and the like, and the leaked fuel may ignite at the location not intended in the design. In such cases, repeated impacts to pistons and liners may cause damage to piston rings and liners.

The start control apparatus of the present embodiment is configured to solve the above-described problems. The start control apparatus of the present embodiment includes first gas sensor 43 (which corresponds to the gas sensor in the claims) for detecting the gas concentration of the gasified DME fuel at a position near combustion chamber 9, scavenging pump 23 for performing scavenging in the location from the upstream side to the downstream side of combustion chamber 9, and the above-described ECU 100. ECU 100 is configured to prohibit the start of engine 1 and operate scavenging pump 23 when DME gas concentration $C1$ detected by first gas sensor 43 before the start of the engine is equal to or greater than predetermined threshold value of $C1s$.

In addition, the start control apparatus of the present embodiment includes second gas sensor 44 (which corresponds to the additional gas sensor in the claims) for detecting gas concentration $C2$ of the gasified DME fuel at a position downstream of combustion chamber 9.

In the present embodiment, first gas sensor 43 is provided at a position upstream of combustion chamber 9, or more specifically at suction manifold 10. To avoid abnormal combustion in combustion chamber 9, it is preferable to detect concentration $C1$ of the gas entering the combustion chamber 9, i.e., the DME gas at a position near combustion chamber 9 on the upstream side immediately after the start of the cranking in a case where it is assumed that cranking is started. Therefore, it is preferable to provide first gas sensor 43 in suction manifold 10 as in the present embodiment. It should be noted that the position of first gas sensor 43 may be changed.

The DME leaked in the cylinder due to defects of injector 7 leaks from the inside of the cylinder where the intake/exhaust valve is open, to the outside of the cylinder, and the DME is retained mainly inside suction manifold 10 and exhaust manifold 20. In the present embodiment, scavenging pump 23 is provided in order to remove the retained DME through scavenging. Scavenging pump 23 is controlled by ECU 100.

In the present embodiment, suction manifold 10 and suction pipe 11 are connected through scavenging pipe 24, and scavenging pump 23 is provided in scavenging pipe 24. One end (entrance end) of scavenging pipe 24 is connected to the entrance of suction pipe 11, i.e., to the position between air cleaner 12 and airflow meter 13 in suction pipe 11, but this connection position can be changed.

In the present embodiment, second gas sensor 44 is provided at exhaust pipe 21, or more specifically, at a position downstream of turbine 14T and upstream of the exhaust post-processing apparatus not illustrated in the drawing. In the present embodiment, second gas sensor 44 is not provided at exhaust manifold 20, but is provided at a position downstream of turbine 14T separated away from combustion chamber 9. It should be noted that the position of second gas sensor 44 can also be changed, and it may be provided at exhaust manifold 20.

Next, a control of the present embodiment is described.

Figure 2:
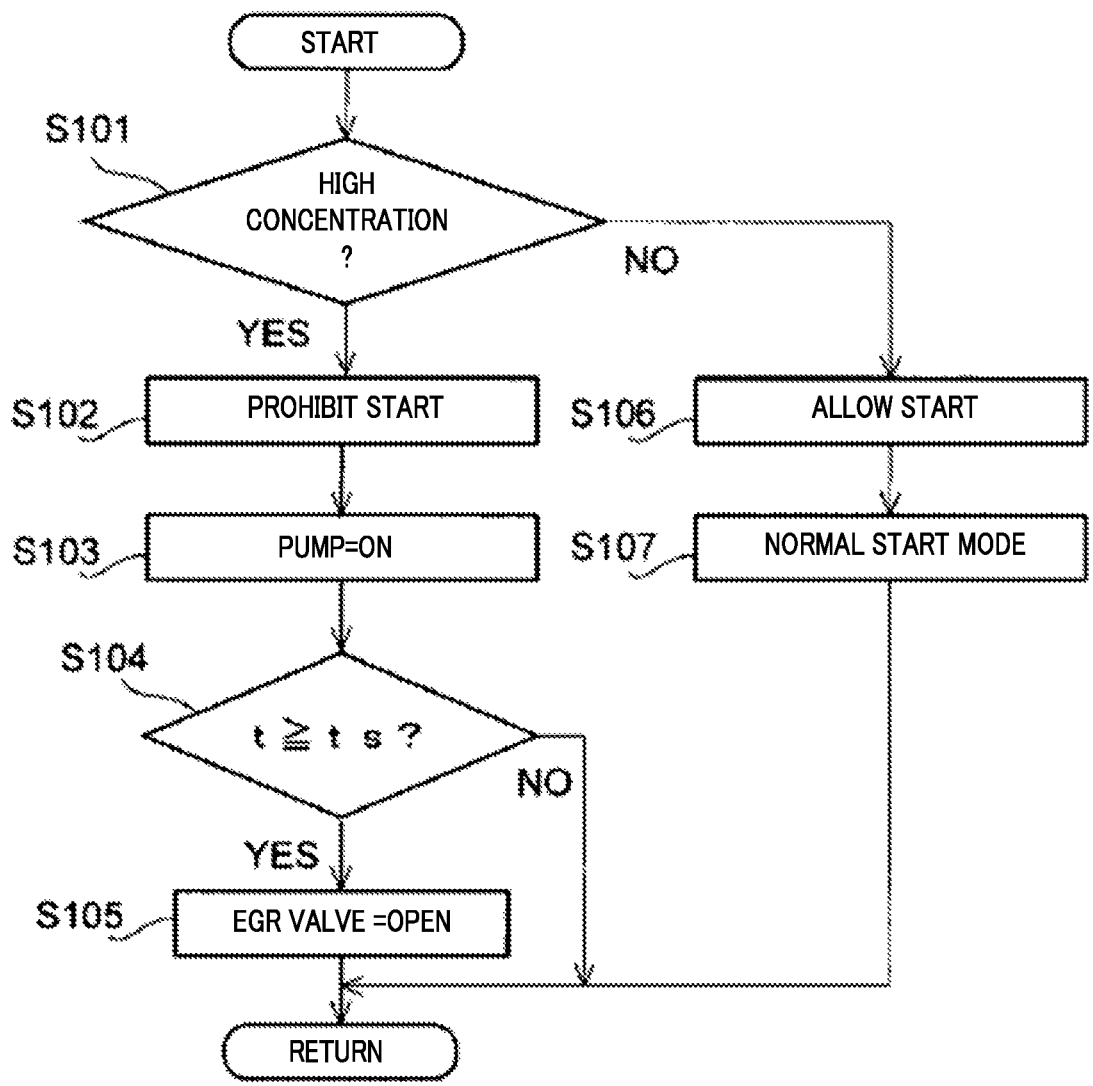
FIG. 2 is a flowchart illustrating a control method according to the present embodiment.

FIG. 2 illustrates a control method of the present embodiment. The routine illustrated in the drawing is repeatedly executed by ECU 100 at predetermined computation cycle T (e.g., 10 msec).

When the engine is stopped, EGR valve 33 is fully closed. When the driver turns on engine switch 42 to start the engine in the state where the engine is stopped, the routine is started.

First, at step S101, ECU 100 determines whether the DME gas concentration near combustion chamber 9 is high concentration. For convenience, the determination whether the concentration is high is referred to as "high concentration determination", and the determination whether the concentration is not high (that is, the determination whether the concentration is low concentration) is referred to as "low concentration determination". The high concentration determination is continuously performed from the time when the high concentration determination start condition described below is satisfied first, to the time when the high concentration determination termination condition is satisfied.

In the present embodiment, the high concentration determination start condition is satisfied when DME gas concentration $C1$ detected by first gas sensor 43 is equal to or greater than predetermined threshold value (first start threshold value) $C1sH$. Threshold value $C1sH$ is set in advance to a minimum or near minimum value of DME gas concentration $C1$ at which abnormal combustion may occur if the cranking is started.

When it is determined at step S101 that the concentration is high (step S101: Yes), i.e., when DME gas concentration $C1$ is determined to be equal to or greater than threshold value $C1sH$, ECU 100 proceeds to step S102 to prohibit the start of the engine, and operates (turns on (ON)) scavenging pump 23 at step S103.

Then, as indicated by the broken arrow a in FIG. 1, the air is introduced to scavenging pipe 24 from suction pipe 11 so as to enter suction manifold 10 through scavenging pipe 24. Then, the air passes through combustion chamber 9 of the cylinder where the intake/exhaust valve is open, and then through exhaust manifold 20, turbine 14T, and exhaust pipe 21 in this order. Along with this air flow, the DME gas retained mainly in suction manifold 10 and exhaust manifold 20 can be discharged to the exhaust side, and thus scavenging of the DME gas can be achieved.

As described above, scavenging pump 23 performs scavenging from a position upstream of combustion chamber 9 to a position downstream of combustion chamber 9.

The start of the engine is prohibited by prohibiting the operation of starter motor 22, for example.

Subsequently, at step S104, ECU 100 determines whether elapsed time t from the start of the operation of scavenging pump 23 has reached predetermined time ts or more. When elapsed time t has not reached predetermined time ts, the process skips step S105. When elapsed time t has reached predetermined time ts, the process proceeds to step S105 to open EGR valve 33. Preferably, the level of the opening at this time is the fully opened level, but it may be an intermediate level smaller than the fully opened level.

In this manner, EGR valve 33 is opened after predetermined time ts has passed from the start of the operation of scavenging pump 23, or in other words, it is opened with a delay or a time difference from the start of the operation of scavenging pump 23.

In the case where DME gas is retained near combustion chamber 9 (suction manifold 10 and exhaust manifold 20), it is recognized that DME gas is retained also inside EGR passage 31. If EGR valve 33 is opened simultaneously with the start of the operation of scavenging pump 23, however, the air mainly flows inside EGR passage 31 immediately after the start of the operation, thereby less flowing inside combustion chamber 9.

In view of this, in the present embodiment, EGR valve 33 is opened with a time difference. In this manner, immediately after the start of the operation of scavenging pump 23, the air mainly passes inside combustion chamber 9, and thus the scavenging of suction manifold 10, combustion chamber 9 and exhaust manifold 20 can be performed with high efficiency. After predetermined time ts has passed, the scavenging of the inside of EGR passage 31 can be performed by opening EGR valve 33. In this manner, the entire scavenging can be can be efficiently performed.

After step S105, the process is returned to step S101, and whether the DME gas concentration near combustion chamber 9 is still high concentration is determined. At this time, when the high concentration determination termination condition described below is not satisfied, it is determined to be high concentration. When the high concentration determination termination condition is satisfied, it is determined to be not high concentration. When it is determined to be high concentration, the process proceeds to step S102 and the above-described control is repeated.

The high concentration determination termination condition is satisfied when the following conditions 1 and 2 are satisfied. Condition 1: DME gas concentration $C1$ detected by first gas sensor 43 is equal to or smaller than predetermined threshold value (first termination threshold value) $C1sL$ ($C1 \le C1sL$). Condition 2: DME gas concentration $C2$ detected by second gas sensor 44 is equal to or smaller than predetermined threshold value (second termination threshold value) $C2sL$ ($C2 \le C2sL$).

First termination threshold value $C1sL$ is a value smaller than the above-described first start threshold value $C1sH$, and is set in advance to a sufficiently small value of DME gas concentration $C1$ at which no abnormal combustion can occur even if the cranking is performed, such as values around zero.

Second termination threshold value $C2sL$ is set in advance to a value equal to or substantially equal to first termination threshold value $C1sL$.

After the start of the operation of scavenging pump 23, the value of DME gas concentration $C1$ detected by first gas sensor 43 gradually decreases. On the other hand, the value of DME gas concentration $C2$ detected by second gas sensor 44 increases first under the influence of the DME gas sent from the upstream side through scavenging, but then conceivably decreases toward the value of DME gas concentration $C1$ detected by first gas sensor 43. In view of this, when $C1 \le C1sL$ and $C2 \le C2sL$ are satisfied, it is determined that the scavenging of the DME gas has been completed and that the DME gas concentration near combustion chamber 9 is not high concentration. In this manner, the fact that the DME gas concentration near combustion chamber 9 is sufficiently reduced can be guaranteed in a backup manner by using the detection value of second gas sensor 44, and thus the occurrence of abnormal combustion when the cranking is performed can be reliably prevented.

In short, from the time when the high concentration determination start condition ($C1 \ge C1sH$) is satisfied for the first time, the determination whether the DME gas concentration near combustion chamber 9 is high concentration (the high concentration determination) is started, and it is determined to be Yes step S101. Thereafter, until the high concentration determination termination condition ($C1 \le C1sL$ and $C2 \le C2sL$) is satisfied, the determination whether it is high concentration is continued. Thereafter, from the time when the high concentration determination termination condition ($C1 \le C1sL$ and $C2 \le C2sL$) is satisfied, the determination whether it is not high concentration (step S101: No), i.e., the low concentration determination, is started.

Then, when it is determined at step S101 that it is not high concentration (step S101: No), ECU 100 proceeds to step S106 to allow for the start of the engine, and transfers to the normal start mode at step S107 to start the engine. The start of the engine is allowed by allowing for the operation of starter motor 22, for example.

In the normal start mode at step S107, ECU 100 starts the engine in accordance with the sequence as described below. The sequence of the present embodiment is substantially the same as typical engine starting sequence.

Step S201: EGR valve 33 is fully closed, scavenging pump 23 is stopped (turned off (OFF)), and feed pump 51 is turned on. When feed pump 51 is turned on, DME fuel at a predetermined feeding pressure is supplied to supply pump 52.

Step S202: starter motor 22 is turned on, and cranking, i.e., rotating of the crankshaft is started. In the case where engine switch 42 is a typical key switch, starter motor 22 may be turned on when the driver sets the key switch to the starter-on position. Along with the rotation of the crankshaft, supply pump 52 is operated, and the fuel is sent under pressure to common rail 8.

Step S203: on the basis of the output of crank angle sensor 40, the rotational frequency of the engine and the top dead center position of the reference cylinder (in the present embodiment, # one-cylinder) are detected. Then, the target fuel injection timing corresponding to the engine rotational frequency and the target common rail pressure required for the starting are calculated. The volume regulation valve of supply pump 52 is controlled such that the actual common rail pressure detected by common rail pressure sensor 54 is close to the target common rail pressure.

Step S204: when the actual common rail pressure reaches near the target common rail pressure and the actual crank angle detected by crank angle sensor 40 reaches the target fuel injection timing, a predetermined amount of fuel suitable for the starting is jetted from injector 7.

Step S205: when the engine starts to perform self-driving, starter motor 22 is turned off. Note that in the case where engine switch 42 is a key switch, starter motor 22 may be turned off when the driver confirms the self-driving and returns the key switch from the starter-on position.

In this manner, according to the present embodiment, when DME gas concentration C1 detected by first gas sensor 43 before the start of the engine is equal to or greater than first start threshold value $C1sH$, the start of the engine is prohibited and scavenging pump 23 is operated. In this manner, the engine can be started after preliminarily performing scavenging of the DME gas retained near combustion chamber 9 before the start of the engine, and thus damages to the engine due to the leakage of the DME fuel can be reliably prevented.

The above is a detailed description of the embodiments of the present disclosure, but there are various possible embodiments and variations of the present disclosure.

(1) For example, an electric turbocharger may be used as turbocharger 14, and a compressor of the electric turbocharger may be used as a scavenging pump. In this case, when the electric turbocharger is turned on, the scavenging of the inside of suction passage 3 can be performed on the downstream side of the compressor and on the upstream side of suction manifold 10 (see virtual line arrow b in FIG. 1), and thus the scavenging of DME gas can be more reliably performed in a wider range. Note that in this case, scavenging pipe 24 is naturally omitted.

(2) Second gas sensor 44 may be provided at a position closer to combustion chamber 9, e.g., at exhaust manifold 20, and the high concentration determination start condition may be set on the basis of second gas concentration C2 detected by second gas sensor 44. For example, when DME gas concentration C2 detected by second gas sensor 44 is equal to or greater than predetermined threshold value (second start threshold value) $C2sH$, it is possible to determine that it is high concentration (step S101: Yes) so as to prohibit the start of the engine (step S102) and turn on scavenging pump 23 (step S103).

Alternatively, it is possible to determine that it is high concentration when both DME gas concentration C1 detected by first gas sensor 43 and DME gas concentration C2 detected by second gas sensor 44 are equal to or greater than threshold value $C1sH$ and $C2sH$, respectively.

Alternatively, it is possible to determine that it is high concentration when one of DME gas concentration C1 detected by first gas sensor 43 and DME gas concentration C2 detected by second gas sensor 44 is equal to or greater than threshold value $C1sH$ or $C2sH$.

(3) The high concentration determination termination condition may be set with only the detection value of first gas sensor 43 by omitting second gas sensor 44. For example, it is possible to determine that it is not high concentration on the condition that DME gas concentration C1 detected by first gas sensor 43 is equal to or smaller than first termination threshold value $C1sL$ (the above-described condition 1) alone.

(4) Conversely, the high concentration determination termination condition may be set based only on the detection value of second gas sensor 44. For example, it is possible to determine that it is not high concentration on the condition that DME gas concentration C2 detected by second gas sensor 44 is equal to or smaller than second termination threshold value $C2sL$ (the above-described condition 2) alone.

(5) In the embodiment, the scavenging pump is provided on the upstream side of the combustion chamber, and the scavenging of the DME gas is performed by pushing the air. Conversely, the scavenging pump may be provided on the downstream side of the combustion chamber so as to perform the scavenging of the DME gas by suctioning the air.

(6) The liquefied gas fuel is not limited to the DME fuel, but may be any liquefied gas fuel. For example, it may be natural gas, hydrogen and the like.

The embodiments of the present disclosure are not limited to the aforementioned embodiments only, and all variations, applications, and equivalents encompassed by the idea of the present disclosure as defined by the claims are included in the present disclosure. Accordingly, the present disclosure should not be construed as limiting, but can be applied to any other technology that falls within the scope of the idea of the present disclosure.

The invention claimed is:

1. A start control apparatus of an internal combustion engine using liquefied gas fuel, the start control apparatus comprising:
   a gas sensor configured to detect a gas concentration of the liquefied gas fuel in a gasified state at a position near a combustion chamber;
   a scavenging pump configured to perform scavenging from a position upstream of the combustion chamber to a position downstream of the combustion chamber; and a control unit configured to prohibit a start of the internal combustion engine and operate the scavenging pump when the gas concentration detected by the gas sensor before the start of the internal combustion engine is equal to or greater than a predetermined threshold value.

2. The start control apparatus of the internal combustion engine according to claim 1, wherein the control unit opens an Exhaust Gas Recirculation (EGR) valve when a predetermined time has elapsed after an operation of the scavenging pump is started.

3. The start control apparatus of the internal combustion engine according to claim 1, wherein the gas sensor is provided at a position upstream of the combustion chamber.

4. The start control apparatus of the internal combustion engine according to claim 3, further comprising an additional gas sensor configured to detect a gas concentration of the liquefied gas fuel in a gasified state at a position downstream of the combustion chamber,
wherein the control unit allows the start of the internal combustion engine and stops the scavenging pump when a gas concentration detected by the gas sensor becomes equal to or smaller than a predetermined threshold value after a start of an operation of the scavenging pump, and a gas concentration detected by the additional gas sensor becomes equal or smaller than a predetermined threshold value.

* * * * *